(12) United States Patent
Slovak et al.

(10) Patent No.: US 7,361,252 B2
(45) Date of Patent: Apr. 22, 2008

(54) METHODS FOR LAMINATING FILMS FOR SPD LIGHT VALVES AND SPD LIGHT VALVES INCORPORATING SUCH LAMINATED FILMS

(75) Inventors: Steven M Slovak, North Massapequa, NY (US); Srinivasan Chakrapani, Commack, NY (US); Robert L Saxe, New York, NY (US)

(73) Assignee: Research Frontiers Incorporated, Woodbury, NY (US)

( * ) Notice: Subject to any disclaimer, the term of this patent is extended or adjusted under 35 U.S.C. 154(b) by 460 days.

(21) Appl. No.: 10/898,303

(22) Filed: Jul. 23, 2004

(65) Prior Publication Data

US 2005/0227061 A1 Oct. 13, 2005

Related U.S. Application Data

(60) Provisional application No. 60/562,329, filed on Apr. 13, 2004.

(51) Int. Cl.
*B29C 65/00* (2006.01)

(52) U.S. Cl. ............ 156/285; 156/104; 156/105; 156/106

(58) Field of Classification Search ........ 156/285, 156/286, 104, 105, 106
See application file for complete search history.

(56) References Cited

U.S. PATENT DOCUMENTS

| | | | |
|---|---|---|---|
| 4,247,175 A | 1/1981 | Saxe | 359/296 |
| 4,407,565 A | 10/1983 | Saxe | 359/296 |
| 4,772,103 A | 9/1988 | Saxe | 359/296 |
| 5,409,734 A | 4/1995 | Lee et al. | 427/163.1 |
| 5,461,506 A | 10/1995 | Check, III et al. | 359/296 |
| 5,463,492 A | 10/1995 | Check, III | 359/296 |
| 5,728,251 A * | 3/1998 | Check, III | 156/307.5 |
| 6,151,153 A | 11/2000 | Bryan | 359/245 |
| 6,271,956 B1 * | 8/2001 | Saxe et al. | 359/296 |
| 6,301,040 B1 | 10/2001 | Chakrapani et al. | 359/296 |
| 6,416,827 B1 | 7/2002 | Chakrapani et al. | 428/1.31 |
| 6,900,923 B2 | 5/2005 | Chakrapani et al. | 359/296 |
| 2004/0033369 A1* | 2/2004 | Fleming et al. | 428/431 |
| 2005/0077005 A1* | 4/2005 | Chen et al. | 156/286 |

OTHER PUBLICATIONS

Crockett, D., "USGMACHINERY—Autoclaves for Glass Lamination", *USGlass*, 33(10) (Oct. 1998).
International Search Report dated May 11, 2006.

* cited by examiner

*Primary Examiner*—Jeff H. Aftergut
*Assistant Examiner*—Daniel McNally
(74) *Attorney, Agent, or Firm*—Ostrolenk, Faber, Gerb & Soffen, LLP

(57) ABSTRACT

The invention is directed to a method for laminating a suspended particle device (SPD) film which comprises forming a suspended particle device film; positioning the suspended particle device film within an unlaminated stack of components for forming a laminated suspended particle device film, wherein the stack comprises at least one hot melt adhesive sheet or film contacting an outer surface of the suspended particle device film; subjecting the unlaminated stack to at least a partial vacuum, preheating the unlaminated stack of components under the vacuum for a time and at a temperature selected to permit at least partial degassing of the stack and applying a sufficient net pressure to the stack at a sufficient temperature and for a sufficient time to produce a laminated suspended particle device film from the unlaminated stack.

51 Claims, No Drawings

METHODS FOR LAMINATING FILMS FOR SPD LIGHT VALVES AND SPD LIGHT VALVES INCORPORATING SUCH LAMINATED FILMS

CROSS-REFERENCE TO RELATED APPLICATIONS

This application claims the benefit of the priority of Provisional Application No. 60/562,329 which was filed Apr. 13, 2004, the contents of which are specifically incorporated herein.

FIELD OF THE INVENTION

The present invention is directed to laminated films for use in suspended particle devices (SPDs) such as SPD light valves, and to methods for laminating such SPD films. In particular the invention relates to a method of laminating SPD films, wherein the film is cross-linked when cured, and laminated SPD films produced by such method.

BACKGROUND OF THE INVENTION

SPD light valves have been known for more than seventy years for the modulation of light. Such light valves have been proposed for use in numerous applications during that time including, e.g., alphanumeric displays and television displays, filters for lamps, cameras, optical fibers and displays, and windows, sunroofs, sunvisors, eyeglasses, goggles, mirrors and the like to control the amount of light passing therethrough or reflected therefrom as the case may be. Examples of windows include, without limitation, architectural windows for commercial buildings, greenhouses and residences, windows for automotive vehicles, boats, trains, planes and spacecraft, windows for doors including peepholes, and windows for appliances such as ovens and refrigerators including compartments thereof. Light valves of the type described herein are also known as suspended particle devices or SPDs.

As used herein, the term light valve describes a cell formed of two walls that are spaced apart by a small distance, with at least one wall being transparent. The walls have electrodes thereon, usually in the form of transparent, electrically conductive coatings. The cell contains a light-modulating element (sometimes herein referred to as an activatable material) which may, without limitation, be either a liquid suspension of particles or a plastic film in which droplets of a liquid suspension of particles are distributed.

The liquid suspension (sometimes herein referred to as a liquid light valve suspension or as a light valve suspension) comprises small particles suspended in a liquid suspending medium. In the absence of an applied electrical field, the particles in the liquid suspension assume random positions due to Brownian movement. Hence, a beam of light passing into the cell is reflected, transmitted or absorbed depending upon the cell structure, the nature and concentration of the particles and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state.

For many applications it is preferable for the activatable material, i.e., the light modulating element, to be a plastic film rather than a liquid suspension. For example, in a light valve used as a variable light transmission window, a plastic film in which droplets of liquid suspension are distributed is preferable to a liquid suspension alone because hydrostatic pressure effects, e.g., bulging associated with a high column of light suspension, can be avoided through use of a film and the risk of possible leakage can also be avoided. Another advantage of using a plastic film is that, in a plastic film, the particles are generally present only within very small droplets and, hence, do not noticeably agglomerate when the film is repeatedly activated with a voltage.

A light valve film (also sometimes herein referred to as an SPD film) as that term is used herein, means a film or sheet, or more than one thereof comprising a suspension of particles used or intended for use in an SPD light valve. Such light valve film shall comprise either (a) a suspension of particles dispersed throughout a continuous liquid phase enclosed within one or more rigid or flexible solid films or sheets, or (b) a discontinuous phase of a liquid comprising dispersed particles, such discontinuous phase being dispersed throughout a continuous phase of a rigid or flexible solid film or sheet. The light valve film or laminates comprising the light valve film may also comprise one or more additional layers such as, without limitation, a film, coating or sheet or combination thereof, which may provide the light valve film with (1) scratch resistance, (2) protection from ultraviolet radiation, (3) reflection of infrared energy, and/or (4) electrical conductivity for transmitting an applied electric or magnetic field to the activatable material.

U.S. Pat. No. 5,409,734 exemplifies a type of non cross-linked light valve film that is made by phase separation from a homogeneous solution. Light valve films made by cross-linking emulsions are also known. The methods of the present invention are specifically directed to the use of the latter type of film, i.e., formed by cross-linking emulsions, and to the laminated films produced thereby. See, for example, U.S. Pat. Nos. 5,463,491 and 5,463,492, both of which are assigned to the assignee of the present invention. Various types of SPD emulsions, and methods of curing the same, are described in U.S. Pat. Nos. 6,301,040 and 6,416,827, and in pending U.S. patent application Ser. No. 10/465,489, all of which are assigned to the assignee to the present invention. Such films and variations thereof may be cured through cross-linking brought about by exposing the films to (1) ultraviolet radiation, (2) electron beams and/or (3) heat. All of the references cited in this application, including patents, are incorporated herein by reference.

In general usage to "laminate" usually means (1) to separate or split into thin layers, (2) to form into a thin metal plate, (3) to construct by placing one layer upon another or (4) to cover or overlay with thin layers. (see, e.g., The Random House Dictionary of the English Language, 1967 edition). In preparing laminated products for use as or in conventional glass windows, definitions (3) and (4) above are applicable. For architectural and windshield glass applications, the lamination process generally involves bonding a plastic interlayer in between two lites (sheets) of flat or curved glass, with the goal of producing a clear unit of shatter-resistant glass.

However, as used herein in relation to SPD films, i.e., in connection with the present invention, the terms laminating, to laminate or the act of lamination refer to the combination as a unit an SPD film with (1) one or more plastic hot melt adhesive sheets or films and/or (2) with one or more glass or plastic sheets for the purpose(s), without limitation thereto, of protecting and/or strengthening the SPD film, any of the purposes mentioned hereinbefore, and/or making it easier to install where intended for use.

A variety of liquid light valve suspensions are well known in the art and such suspensions are readily formulated according to techniques well-known to one of ordinary skill therein. The term liquid light valve suspension, as noted above, when used herein means a liquid suspending medium in which a plurality of small particles are dispersed. The liquid suspending medium comprises one or more non-aqueous, electrically resistive liquids in which there is preferably dissolved at least one type of polymeric stabilizer which acts to reduce the tendency of the particles to agglomerate and to keep them dispersed and in suspension.

Liquid light valve suspensions useful in the present invention may include any of the so-called prior art liquid suspending media previously proposed for use in light valves for suspending the particles. Liquid suspending media known in the art which are useful herein include, but are not limited to, the liquid suspending media disclosed in U.S. Pat. Nos. 4,247,175, 4,407,565, 4,772,103, 5,409,734, 5,461,506, and 5,463,492, the disclosures of which, as noted above, are incorporated herein by reference. In general one or both of the suspending medium or the polymeric stabilizer typically dissolved therein is chosen so as to maintain the suspended particles in gravitational equilibrium.

The polymeric stabilizer, when employed, can be a single type of solid polymer that bonds to the surface of the particles, but which also dissolves in the non-aqueous liquid (s) which comprise the liquid suspending medium. Alternatively, there may be two or more solid polymeric stabilizers serving as a polymeric stabilizer system. For example, the particles can be coated with a first type of solid polymeric stabilizer such as nitrocellulose which, when dissolved, provides a plain surface coating for the particles, together with one or more additional types of solid polymeric stabilizer that, when dissolved, bond to or associate with the first type of solid polymeric stabilizer and also dissolve in the liquid suspending medium to provide dispersion and steric protection for the particles. Alternately, liquid polymeric stabilizers may also be used to advantage, especially in SPD light valve films, as described for example in U.S. Pat. No. 5,463,492.

Inorganic and organic particles may be used in a light valve suspension, and such particles may be either light absorbing or light reflecting in the visible portion of the electromagnetic spectrum.

Conventional SPD light valves have generally employed particles of colloidal size. As used herein the term colloidal means that the particles generally have a largest dimension averaging 1 micron or less. Preferably, most polyhalide or non-polyhalide types of particles used or intended for use in an SPD light valve suspension will have a largest dimension which averages 0.3 micron or less and more preferably averages less than one-half of the wavelength of blue light, i.e., less than 2000 Angstroms, to keep light scatter extremely low.

SUMMARY OF THE INVENTION

The invention provides a method for laminating a suspended particle device (SPD) film. The method comprises forming a suspended particle device film; positioning the suspended particle device film within an unlaminated stack of components for forming a laminated suspended particle device film, which stack comprises at least one hot melt adhesive sheet or film contacting an outer surface of the suspended particle device film; subjecting the unlaminated stack to at least a partial vacuum; preheating the unlaminated stack of components under such vacuum for a time and at a temperature selected to permit at least partial degassing of the stack; and applying a sufficient net pressure to the stack at a sufficient temperature and for a sufficient time to produce a laminated suspended particle device film from the unlaminated stack.

In producing the above lamination, the suspended particle device film is prepared, in one embodiment, by a method which comprises providing a first substrate comprised of plastic or glass having first and second opposed surfaces; bonding a first layer of a substantially transparent electrically conductive coating to at least a portion of one of the opposed surfaces of the first substrate; applying a layer of an uncured liquid SPD emulsion upon the coating, the emulsion comprising a plurality of uncrosslinked polymer chains for forming a polymer matrix and at least one liquid light valve suspension; curing the SPD emulsion by cross-linking the polymer chains to form a cured SPD emulsion having a plurality of uncrosslinked droplets of a liquid light valve suspension distributed therein; and sandwiching together with the first coated substrate a second substrate coated with a second layer of the substantially transparent electrically conductive coating, wherein the second layer of the substantially transparent electrically conductive coating is in contact with the cured SPD emulsion on the first substrate, so as to form the suspended particle device film.

In one embodiment of the invention, the liquid SPD emulsion may be cured by exposing the uncured emulsion to ultraviolet radiation, an electron beam and/or heat.

The method of the invention may further comprise, in an alternate embodiment, providing the second substrate with a cured SPD emulsion upon the second layer of the substantially transparent electrically conductive coating prior to sandwiching the second substrate together with the first substrate.

In a further embodiment of the invention, the substantially transparent electrically conductive coating is comprised of indium tin oxide. In another embodiment, at least one of the substantially transparent electrically conductive coatings is further provided with a dielectric overcoat located thereon. The dielectric overcoat may be, for example, $MgF_2$ or SiO.

In another embodiment, the hot melt adhesive used in the method is selected from the group consisting of an ethylene/vinyl acetate copolymer, a polyurethane polymer and polyvinyl butyral. In a further embodiment, at least one of the substrates is formed of plastic and the plastic is polyethylene terephthalate (PET) or a polycarbonate (PCA) plastic.

In a further embodiment of the invention, wherein the hot melt adhesive is comprised of a polyurethane polymer or polyvinyl butyral, the method of the invention further comprises substantially preventing contact between the hot melt adhesive, when the adhesive is heated, and the suspended particle device, as well as any protrusions extending outwardly from the film. In one embodiment, the contact is prevented by interposing a substantially chemically inert plastic material adjacent an outer edge portion of the suspended particle device film, including any protrusions, at a location chosen to substantially prevent contact of the hot melt adhesive, when the adhesive is heated, with the film and any such protrusions.

In an optional embodiment, the substantially chemically inert plastic material may be provided on at least one opposed surface thereof with an adhesive, e.g., a pressure sensitive adhesive, to facilitate bonding thereof. In a preferred embodiment, the plastic material has a melting point higher than the melting point of the hot melt adhesive. In a further embodiment, the plastic material is polyethylene terephthalate, sold under the trade name Mylar®. The plastic material, in one embodiment, has a thickness of <2 mils, preferably <1 mil and even possibly as thin as 0.5 mil.

In one embodiment, the plastic material is interposed as a plurality of sheets or strips. Still further, in another embodiment, the plastic material may be shaped into the form of at least one frame, wherein the frame is configured to protect at least the outer edge portion of the suspended particle device film from contact with the hot melt adhesive, while leaving a central viewing portion of the film substantially uncovered by the plastic material. The central viewing portion may be configured, for example, in the shape of a polygon, a circle or an oval. In a further embodiment two such frames may be applied, i.e., one on each opposed surface of the suspended particle device film.

In still another embodiment, the vacuum applied to the unlaminated stack of components is at least about 29 inches of mercury. In a further embodiment, the preheating temperature is between about room temperature and a glass transition temperature which is the lowest glass transition temperature of any hot melt adhesive in the laminate. In a particular embodiment, the at least one hot melt adhesive sheet or film has a melting range having a low end of at least about 75 degrees C. In a further embodiment, the at least one hot melt adhesive sheet or film has a melting range with a low end of at least about 85 degrees C.

In another embodiment of the invention, the net pressure ranges between about 2.8 psi and 27 psi. In one embodiment the net pressure is applied to the stack for between about 3-5 hours at a temperature high enough to substantially melt the at least one hot melt adhesive sheet or film, but below a temperature which would cause the SPD film to spread (ooze) beyond the boundary of the cured film prior to lamination.

In one embodiment of the invention the liquid light valve suspension comprises a plurality of colloidal particles having a largest dimension averaging 1 micron or less. In another embodiment, the particles have a largest dimension which averages 0.3 microns or less. In a further embodiment the polymer chains are comprised of a polyorganosiloxane polymer. In another embodiment the polymer matrix comprises no less than 60% of the overall emulsion. In still another embodiment, the matrix of the emulsion may comprise a copolymer of about 90% by weight (a) poly (dimethyl diphenyl siloxane, disilanol terminated) and about 10% by weight (b) acryloxy propyl methyl dimethoxy silane.

The laminated suspended particle device film of the invention may, in one embodiment, be laminated in an autoclave adapted to provide sufficient net pressure, temperature and vacuum to permit lamination of the film.

The invention additionally provides a method wherein a layer of polyvinyl butyral is laminated between two glass sheets to form a second laminate, following which the second laminate is laminated to the laminated suspended particle device film. Such lamination may be obtained, for example, using either a polyurethane polymer or a sheet or film of ethylene/vinyl acetate copolymer between glass sheets located on the exterior of both of the laminates.

In a still further embodiment, the invention provides a method for laminating a suspended particle device which comprises forming a suspended particle device film; positioning the suspended particle device film within an unlaminated stack of components for forming a laminated suspended particle device film, which stack comprises at least one hot melt adhesive sheet or film contacting an outer surface of the suspended particle device film; subjecting the unlaminated stack to at least a partial vacuum; preheating the unlaminated stack of components under such vacuum for a time and at a temperature selected to permit at least partial degassing of the stack; and applying a sufficient net pressure to the stack at a sufficient temperature and for a sufficient time to produce a laminated suspended particle device film from the unlaminated stack. Moreover, in the above-described method, the suspended particle device film is prepared by a method which comprises providing a first substrate comprised of plastic or glass having first and second opposed surfaces; bonding a first layer of a substantially transparent electrically conductive coating to at least a portion of one of the opposed surfaces of the first substrate; applying a layer of an uncured liquid SPD emulsion upon the coating, the emulsion comprising a plurality of uncrosslinked polymer chains for forming a polymer matrix and at least one liquid light valve suspension; curing the SPD emulsion by cross-linking the polymer chains to form a cured SPD emulsion having a plurality of uncrosslinked droplets of a liquid light valve suspension distributed therein; and sandwiching together with the first coated substrate a second substrate coated with a second layer of the substantially transparent electrically conductive coating, wherein the second layer of the substantially transparent electrically conductive coating is in contact with the cured SPD emulsion on the first substrate, so as to form the suspended particle device film.

In a further embodiment of the method, the hot melt adhesive may be selected from the group consisting of an ethylene/vinyl acetate copolymer, a polyurethane polymer and polyvinyl butyral and, when the adhesive a polyurethane polymer or polyvinyl butyral, the method may further comprise substantially preventing contact between the hot melt adhesive, when the adhesive is heated, and the suspended particle device film, as well as any protrusions extending outwardly from the film.

In one embodiment, the contact is prevented by interposing a substantially chemically inert plastic material (e.g., Mylar®) adjacent an outer edge portion of the suspended particle device film, including any protrusion from the film, at a location chosen to substantially prevent contact of the hot melt adhesive, when the adhesive is heated, with the film and any such protrusion.

In an additional embodiment, the method may further comprise laminating at least one layer of polyvinyl butyral between two glass (or plastic) sheets to form a second laminate, and then laminating the second laminate to one side of the laminated suspended particle device film. In the case of a suspended particle device film having a glass sheet forming at least one face thereof, an embodiment of the invention may entail using either a polyurethane polymer, or a sheet or film of ethylene/vinyl acetate copolymer between glass sheets located on the outer surfaces of both laminates.

In a further embodiment, the method may additionally comprise providing the second substrate with a cured SPD emulsion upon the second layer of the substantially transparent electrically conductive coating, prior to sandwiching the second substrate with the first substrate.

In an alternate embodiment, at least one of the transparent, electrically conductive coatings may be further provided with a dielectric overcoat located thereon. The dielectric overcoat may comprise, for example, $MgF_2$ and/or $SiO$.

In one embodiment of the invention, the substantially chemically inert plastic material has a melting point higher than the melting point of the hot melt adhesive, as well as a thickness of less than about 2 mils. The plastic material is, in one embodiment, interposed as a plurality of sheets or strips. In an alternate embodiment, the plastic material may be formed into the shape of at least one frame, configured to protect the outer edge portion of the suspended particle device film, while leaving a central viewing portion of the film substantially uncovered by the plastic material.

In an embodiment of the method, the vacuum applied to the unlaminated stack of components is at least about 29 inches of mercury. In a further embodiment, the pre-heating temperature is between about room temperature and a glass transition temperature which is the lowest glass transition temperature of any hot melt adhesive in the laminate. In an additional embodiment, the net pressure may range between about 2.8 psi and 27 psi.

In still another embodiment, the net pressure is applied to the stack for between about 3-5 hours at a temperature high enough to substantially melt the at least one hot melt adhesive sheet or film, but below a temperature which would cause the SPD film to spread during lamination beyond a boundary which the cured film had prior to lamination.

In another embodiment the liquid light valve suspension used in the method described above, comprises a plurality of colloidal particles having a largest diameter averaging 1 micron or less. In a further embodiment, the polymer chains are comprised of a polyorganosiloxane polymer. In an additional embodiment, the polymer matrix comprises no less than 60% of the overall emulsion. In another embodiment, the matrix of the emulsion may comprise a copolymer of about 90% by weight (a) poly (dimethyl diphenyl siloxane, disilanol terminated) and about 10% by weight (b) acryloxy propyl methyl dimethoxy silane.

In a further embodiment, the suspended particle device film is laminated in an autoclave adapted to provide sufficient net pressure, temperature and vacuum to laminate the film.

The invention is further directed to a laminated suspended particle device film produced according to any of the methods described above.

The invention is additionally directed to a light valve comprising a cell formed of opposed cell walls, a light modulating unit located between the cell walls, and opposed electrode means operatively associated with the cell walls for applying an electrical field across the light modulating unit, wherein the light modulating unit comprises a laminated suspended particle device produced according to any of the methods described above.

DETAILED DESCRIPTION OF THE PREFERRED EMBODIMENTS OF THE INVENTION

Apparatus for laminating layers of glass and plastic, which is also useful for laminating plastic with other plastic layers, is very well known among those of ordinary skill in the art and is generally described in Crockett, D., "USG Machinery-Autoclaves for Glass Lamination", *U.S. Glass Magazine*, October 1998 (the Crockett Article). The process of laminating plastic to plastic or plastic to glass for use in an SPD device requires a number of well-known steps including, inter alia, controlled combinations of pressure and heat. In order for the final laminate to be commercially acceptable, one needs to avoid a number of problems which can occur if the lamination procedure is faulty.

The main problems which are observed in an SPD film as a result of faulty lamination procedure(s) are one or more of the following types of defects: (1) trapped air bubbles, (2) trapped water vapor, (3) oozing (spreading) of cured SPD emulsion out of the film, (4) reduction of the light transmission range of the SPD film when activated compared to the same film prior to lamination, (5) increased on-state haze of the SPD film when activated compared to the same film prior to lamination and (6) delamination of the hot melt adhesive plastic layer from an adjacent layer or layers to which it had been bonded, or failure of the hot melt adhesive(s) to bond to part or all of an adjacent layer or layers (non-lamination or partial lamination).

Obviously, to avoid all of the aforesaid possible problems, very careful attention to detail is necessary. It should also be noted that the composition of the SPD emulsion matrix and of the droplets of liquid suspension distributed therein each have an important effect on the tolerable and/or desirable levels of heat and pressure that can be applied to achieve a successful lamination. For example, appropriate procedures for laminating non-crosslinked SPD films, such as those described in U.S. Pat. No. 5,409,734, are different than the laminating procedures recommended for use with the cross-linked SPD films used in the methods of the present invention because, among other reasons, the matrix polymer disclosed in U.S. Pat. No. 5,409,734 is poly (methyl methacrylate) which has a relatively high glass transition temperature (softening point), whereas the matrix polymer in the best known type of cross-linked SPD film is a relatively soft polyorgansiloxane material which has a relatively low glass transition temperature. Moreover, although in an SPD film the liquid suspension is selected to be immiscible with the matrix material at room temperature (25 degrees C.), if the temperature is raised to too high a level during lamination, some degree of miscibility of the matrix and liquid suspension may occur, in which event certain properties of the film will be degraded. Accordingly, the heat and pressure parameters that may be applied during successful lamination of cross-linked SPD films are necessarily somewhat different than for a non-cross-linked SPD film.

For some applications, especially where low weight is important, the unit (a lamination or the laminate) may comprise the cured SPD layer with only plastic sheets and films, i.e., without any glass sheets. Without limitation, ultraviolet absorbing materials may be incorporated in the plastic hot melt adhesive sheets or films and/or in the polyethylene terephthalate (PET) or alternative plastic sheets usually used in the SPD film, to reduce or prevent degradation by ultraviolet radiation of the SPD film or particles or other components of the film and/or to protect objects on the side of the unit opposite from impinging ultraviolet radiation. The term hot melt adhesive as used herein means a plastic sheet or film which softens and melts over a temperature range above room temperature (room temperature is defined herein as 25 degrees C.), and is generally effective when used as an intermediate layer (a) to bond one type of plastic to another or (b) to bond a plastic sheet or film to a glass sheet. Without limitation thereto, types of hot melt adhesives useful with the present invention include plastic sheets or films of ethylene/vinyl acetate copolymers (EVA), various types of polyurethane (PU) polymers and polyvinyl butyral (PVB). Such hot melt adhesive sheets or films may have any desired thickness and may have a wide variety of melting ranges, depending on the nature of the plastic material and its viscosity or molecular weight. After an SPD film has undergone lamination, by methods more fully described hereinafter; the unit is sometimes hereinafter referred to as a laminated SPD film or a laminated light valve film.

In the examples of SPD lamination described below, a simple non-limiting embodiment of a light valve film is used. This exemplary embodiment comprises two sheets of transparent polyethylene terephthalate (PET) plastic sheet, each of which has on one surface thereof facing one another, a transparent electrically conductive coating of indium tin oxide (ITO), and sandwiched in between the two facing ITO coatings is a layer of cured cross-linked SPD emulsion. The PET sheets may be of any desired thickness, e.g., 5 or 7 mils, but may be thinner or thicker when appropriate.

An autoclave, which is a device well known in the art (and which is broadly described in the Crockett Article), may be used in carrying out the lamination methods described herein. Autoclaves are intended to apply heat, pressure and vacuum uniformly within a controlled environment, even for curved glass or plastic shapes. Autoclaves can generally handle a plurality of items to be laminated, and can be rapidly heated and cooled to accommodate mass production. Some autoclaves can achieve a pressure capability of up to 700 pounds per square inch and temperatures of up to 1,100 degrees F., although lower pressures and temperatures are more commonly employed.

There are numerous manufacturers of autoclaves worldwide, having a variety of engineering features, operational capabilities, specifications and prices. Two companies which manufacture and sell autoclaves of the type useful in the present invention in the United States are ASC Process Systems of 20765 Superior St., Chatsworth, Calif. 91311, and McGill AirPressure Corporation of 190 East Broadway Ave., Westerville, Ohio 43081.

Because even relatively inexpensive autoclaves generally cost at least tens of thousands of dollars, for situations where mass production is not required, for example laboratory work, one may alternatively use a laminating press which generally costs only a fraction of the cost of an autoclave. The examples of SPD lamination described below were conducted using a Carver Hydraulic Laboratory Press (Catalog # 4122-4010, Model # 12-12H, hereinafter referred to as the Carver Press), which is highly effective for this purpose. The Carver Press is manufactured by Carver, Inc. of Wabash, Ind. If an SPD lamination is successfully achieved by using a laminating press such as the aforementioned Carver Press, one is substantially assured of successful lamination in an autoclave because of more uniform and precise pressure and temperature controls in an autoclave.

Methods of making and curing SPD films are disclosed in the prior art and in pending U.S. patent application Ser. No. 10/465,489 mentioned above.

EXAMPLES

The following examples are provided only for the purpose of illustrating the invention and should not be construed as limiting the invention in any manner. The procedures described herein for preparing and laminating an SPD film are particularly effective in overcoming the main lamination problems noted above in an expeditious manner.

The procedure employed was as follows:
1. (a) As described herein in 1(a) and (b), an SPD film having a refractive index (RI) of 1.4720 (±005) for both its matrix and liquid suspension was prepared by curing an SPD emulsion open face, i.e., by exposing to ultraviolet radiation an uncured liquid SPD emulsion which had been spread as an approximately 2-mil thick coating on a very thin ITO transparent electrically conductive coating bonded to and overlying a first plastic (PET) substrate. Exposure to the ultraviolet radiation, preferably in an inert atmosphere, e.g., without limitation, nitrogen or argon, cured the SPD emulsion by cross-linking polymer chains therein. The cured SPD emulsion comprised a solidified cured matrix constituting a majority of the cured emulsion, within which a vast number of extremely small (uncrosslinked) droplets of liquid suspension were distributed.

(b) A second ITO-coated PET substrate was then sandwiched with the first substrate so that the ITO coating of the second substrate was in contact with the cured emulsion on the first ITO-coated PET substrate. The cured SPD emulsion when sandwiched between PET (or alternative) substrates comprises what is herein referred to as an "SPD film". It should be understood, however, that other related embodiments of such an SPD film are within the scope of the present invention. For example, the second PET substrate may also be provided thereon with another layer of a cured SPD emulsion before being sandwiched. Also the ITO coatings may have dielectric overcoatings thereon such as, without limitation, $MgF_2$ or SiO, to prevent or minimize any possible chemical reaction between the ITO or its substrate and the emulsion.

2. The sandwiched SPD film described in 1(b) above is then combined with all other components of the intended laminate. For example, two sheets of hot melt adhesive (such as polyurethane or ethylene/vinyl acetate) are placed on opposite sides of the SPD film, and then glass sheets are placed on opposite sides of the stack of components, outside the hot melt adhesive sheets. In this embodiment of the invention the stack comprises, in sequence, a first glass sheet, a first sheet of hot melt adhesive, the SPD film (comprising cured SPD emulsion sandwiched between two ITO-coated PET substrate sheets), a second sheet of hot melt adhesive and a second glass sheet, all "stacked" substantially congruent to one another with electrically conductive leads protruding therefrom, or with the SPD film or at least one of the SPD film's ITO-coated PET substrates protruding slightly to enable electrical connections to be more easily made to the SPD film and laminated SPD film. For simplicity, this unlaminated group of components is sometimes referred to herein as the "stack" or the "unlaminated stack".

As discussed hereinafter in greater detail, in certain laminated SPD films, i.e., wherein polyurethane (PU) or polyvinyl butyral (PVB) is used as the hot melt adhesive, it has been found to be useful to further protect the cured emulsion by (a) covering the edges (but preferably not the (more centrally located) viewing areas, i.e., located inwardly of the edges) of the SPD film with thin, chemically inert plastic sheets placed between the sheets of hot melt adhesive and the underlying glass or plastic sheet, as well as protecting any protrusions extending outwardly from within the film (e.g., the leads for providing current to the system) with the same material. Alternately, the inert plastic sheets may be placed over only the exposed edge of the cured emulsion, located between the two ITO coated glass or plastic (e.g., PET) substrates, i.e. without wrapping the sheets along the outer edges of the glass or plastic substrates. With either arrangement, the idea is to prevent the components of the hot melt adhesive, when such adhesive is heated, from contacting the cured SPD emulsion.

3. The stack described in 2 above is placed in a vacuum bag within the Carver Press and a strong vacuum is applied (defined as greater than 29 inches of mercury). The platens of the press are then arranged to touch the outsides of the unlaminated stack and their temperature is raised to 70 degrees C. After reaching this temperature the vacuum is continued for 30 minutes in order to effectively degas and simultaneously preheat the stack and, in particular, the hot melt adhesive. Degassing the stack substantially removes therefrom any volatile solvents, trapped water vapor and air bubbles. The vacuum is thereafter maintained substantially throughout the lamination process. The 70 degrees C. temperature is not critical and a lower temperature, e.g., 50 degrees C. could also be effective. However, the preheating temperature should preferably be below the lowest end of the glass transition temperature range of the hot melt adhesive. In an autoclave, which contains no platens, preheating before applying greater than atmospheric pressure to the unlaminated stack can be achieved by alternate means which are well known in the art, such as the use of a high-pressure inert gas, which offers enhanced uniformity of the pressure applied to the stack.

4. After preheating the unlaminated stack as described in no. 3 above, moderate pressure above atmospheric pressure (atmospheric pressure is equal to 14.69594 psi), which is sometimes hereinafter referred to as the net pressure, is applied to the stack for 3-5 hours at a temperature high enough to completely melt the hot melt adhesive sheets but not high enough to cause the SPD film to ooze (spread) beyond the boundaries of the cured film prior to lamination, or to significantly degrade the performance of the film. In the examples of successful SPD lamination given in Table 1 below, a net pressure ranging from about 2.8 psi (pounds per square inch) to 26.1 psi was effective in combination with lamination temperatures in the range of 95 degrees C. to 98 degrees C. The net pressure applied during lamination is the excess pressure applied above standard atmospheric pressure (14.69594 psi). In general, one would not want to use a hot melt adhesive that would begin melting at a temperature so low that it might be less than the highest expected operating temperature of the laminated SPD film. Therefore, it is recommended that the low end of the melting range of the hot melt adhesive be at least 75 degrees C. For SPD films which have a relatively soft polyorganosiloxane matrix, slight oozing of the film has sometimes been observed at or above 105 degrees C. Therefore, for such films the lamination temperature should be below 105 degrees C. Other SPD films which have different matrices disclosed in the prior art which have a higher glass transition temperature, should be able to tolerate lamination temperatures of 120 degrees C. or more, however.

Table 1 below provides numerous examples of SPD films which have been successfully laminated using the Carver Press under the conditions described above and in the Table, subject to the qualifications and protective measures described herein wherein laminates are formed with polyurethane or polyvinyl butyral as the hot melt adhesive. Subject to the aforesaid qualifications and protective measures, any laminated SPD film which exhibits no oozing or delamination (or non-lamination or partial lamination) and whose range of light transmission (referred to as $\Delta T$ in the Table) after lamination is either equal to or greater than its range before lamination, or which is less than 5 units of $\Delta T$ less than its light transmission before lamination, is deemed to be successfully laminated in terms of the present invention. In fact $\Delta T$ improved as a result of lamination in a majority of the examples given.

In cases where polyurethane (PU) is incorporated as the hot melt adhesive in the laminated stack, dark lines have been noted, appearing as a dark frame around the lamination, at the edges of the cured emulsion layer of the SPD film. This apparent frame has a negative effect upon the appearance of the laminate, and may substantially affect the light transmission capabilities of the laminate, e.g., by creating a haze within the laminate and thus reducing the amount of light transmitted therethrough or reflected thereby. Without being bound by theory, it is believed that the urethane linkages in the polyurethane hot melt adhesive degrade some of the polyiodide particles in the cured emulsion layer while the polyurethane is melted, when the molten polyurethane contacts the outer edges of the cured emulsion. One means for avoiding the creation of such a frame is to use particles in the emulsion which are not degraded upon contact with molten polyurethane. Since, however, in the present invention, it is often desirable to use particles which may suffer such degradation, an alternate method (as described below) has been developed for preventing the creation of such dark areas in the emulsion.

In particular, contact between the hot melt adhesive (in the molten state) and the cured emulsion is prevented by placing pieces (e.g., sheets, strips, etc.) of (preferably transparent) substantially chemically inert plastic including, but not limited to polyethylene terephthalate sheets sold under the trade name Mylar®, with or without a pressure-sensitive adhesive on one or both opposed surfaces, all along and overlapping the outer edges of the SPD film and also overlapping any and all protrusions from the SPD film, which protrusions typically comprise a two-layer ITO (indium tin oxide) PET substrate. The inert plastic may, if desired, be pre-formed into a frame of a particular shape (e.g., a square, oval, circle, rectangle, etc.) configured to cover the edges of the laminated stack and preventing contact between the molten hot melt adhesive and the cured emulsion. The frame may be formed from a single sheet of film, or alternately, be pieced together from a plurality of pieces, strips or sheets of such film or may be formed from a single sheet of film. The plastic sheets, strips, etc. (e.g., Mylar®) used for this purpose are preferably very thin, typically two mils or less in thickness, preferably 1 mil or less and more preferably 0.5 mil in thickness.

Preferably, the inert plastic should have a melting point higher than the melting point of the hot melt adhesive used in forming the stack. The cured emulsion must be protected on both sides of the stack and thus, in one embodiment, two plastic "frames" are included, one on each side of the SPD film. In an alternate embodiment the protection from contact with the molten adhesive can be provided by multiple pieces, e.g., strips, sheets, etc. placed on either side of the SPD film at locations appropriate for preventing contact between the hot melt adhesive (when made molten during the lamination process) and the emulsion. In a still further embodiment, the inert plastic material may be positioned inwardly from the two ITO-coated substrates used in forming the SPD film, forming a protective perimeter around the cured SPD emulsion. Although plastic strips and/or a plastic frame are preferred since they cover only the edges of the laminate, i.e., they do not cover the viewing area, the invention additionally contemplates the use of a continuous sheet or film of the inert plastic, which may or may not have a pressure sensitive adhesive on one or both sides, which is placed on both external sides of the SPD film and which thus does cover the entire surface of the laminate including the viewing area.

When polyvinyl butyral (PVB) in the form of, e.g., sheets or films, is used as the hot melt adhesive in a laminate stack (i.e., instead of polyurethane) it is again recommended to use a frame, or alternately, pieces such as strips of the substantially chemically inert, preferably transparent plastic (e.g., Mylar®) in the manner as discussed above to prevent contact between molten PVB and the cured emulsion during formation of the laminate. This is because, where PVB is used as the hot melt adhesive in laminate formation, a substantial reduction in the range of light transmission occurs, although no color change of the film is noted. While the inventors do not wish to be bound by their hypothesis, it is believed that the sheets or films of PVB contain therein a somewhat electrically conductive plasticizer which is liquid when the PVB becomes molten. The plasticizer is believed to at least partially permeate the cured emulsion during lamination, without necessarily chemically degrading the emulsion. It is noted that if the droplets of liquid suspension in the cured emulsion become somewhat more electrically conductive because some conductive plasticizer was added thereto, when after lamination one applies a given voltage to the laminated stack, the range of light transmission will be less than the range of light transmission of the SPD film alone, observed prior to its lamination within the stack, with the same applied voltage. However, with the use of the inert plastic strips, frames, etc. the cured emulsion is protected from the molten PVB during lamination, and a very satisfactory laminated stack is achieved, using PVB as the hot melt adhesive, as detailed in Table 1 below.

TABLE 1

LAMINATION DATA

| Hot-Melt adhesive type and Thickness | Matrix/ suspension (%) | Temperature, °C. | Cooling cycle | Delamination | Gain or Loss Of ΔT | Oozing | Quality of Lamination | Net Pressure, psi |
|---|---|---|---|---|---|---|---|---|
| PU/25 mil | 65:35 | 70 C./30 m; 95 C./3 hrs; 25 C./30 min | 3.01 min | No | 1.5 | No | very good | 9.4 to 21.1 |
| PU/25 mil | 65:35 | 70 C./30 m; 95 C./3 hrs; 25 C./30 min | 3.16 min | No | 1.7 | No | very good | 9.4 to 22.2 |
| PU/25 mil | 65:35 | 70 C./30 m; 95 C./3 hrs; 25 C./30 min | 3.15 min | No | 0.44 | No | very good | 6.1 to 21.1 |
| PU/25 mil | 65:35 | 70 C./30 m; 95 C./3 hrs; 25 C./30 min | 3.15 min | No | 4.2 | No | very good | 6.1 to 19.4 |
| PU/25 mil | 65:35 | 70 C./30 m; 98 C./3.5 hrs; 25 C./30 min | 3.16 min | No | −0.17 | No | very good | 11.1 to 21.1 |
| PU/25 mil | 65:35 | 70 C./30 m; 98 C./3.5 hrs; 25 C./30 min | 3.16 min | No | 1.75 | No | very good | 11 to 22.22 |
| PU/25 mil | 65:35 | 70 C./30 m; 98 C./3.5 hrs; 25 C./30 min | 3.2 min | No | −0.7 | No | very good | 12.8 to 20 |
| PU/25 mil | 65:35 | 70 C./30 m; 98 C./4.5 hrs; 25 C./30 min | 3.2 min | No | 2.7 | No | very good | 6.7 to 18.9 |
| PU/25 mil | 62.5:37.5 | 70 C./30 m; 98 C./4.5 hrs; 25 C./30 min | 3.08 min | No | 1 | No | very good | 11.7 to 26.1 |
| EVA/15 mil | 65:35 | 70 C./30 m; 87 C./2 hrs 25 C./30 min | 3.10 min | No | 0.4 | No | very good | Maintained at 6.7 |
| EVA/10 mil | 65:35 | 30 C./30 m; 90 C./2 hrs; 25 C./15 min | 6 minutes | No | 2 | No | very good | 6 to 9 |
| EVA/10 mil | 65:35 | 70 C./30 m; 90 C./2 hrs; 25 C./30 min | 3.10 min | No | −1 | No | very good | 5 to 2.8 |
| EVA/30 mil | 65:35 | 70 C./30 m; 85 C./2 hrs; 25 C./30 min | 3.10 min | No | 1.1 | No | very good | Maintained at 6.7 |
| EVA/30 mil | 60:40 | 70 C./75 m; 95 C./2 1/2 hrs; 25 C./30 min | 3.30 min | No | 2.5 | No | very good | Maintained at 6.7 |
| *PU/25 mil | 62:38 | 70 C./30 m; 98 C./4 1/2 hrs. | 4.00 min | No | 2.6 | No | very good | 12.2 to 17.8 |
| *PVB/30 mil | 62:38 | 70 C./30 m; 98 C./4 3/4 hrs; | 3.51 min | No | −0.6 | No | very good | 12.2 to 19.4 |
| *PVB/30 mil | 62:38 | 70 C./30 m; 98 C./4 3/4 hrs; | 3.51 min | No | −0.6 | No | very good | 12.2 to 17.2 |

1) PU is polyurethane
2) EVA is ethylene-vinyl acetate copolymer
3) PVB is poly(vinyl butyral)
4) Any tests for which data is preceded by an asterisk ("*") means that inert frames or pieces of Mylar ® plastic (PET) were placed over all edges of the five-layered SPD film and protrusions thereof which generally have only two layers, i.e., PET and an ITO coating thereon, but not placed over the viewing area; the sheets or films of hot melt adhesive are placed on top of both the inert frames or pieces of Mylar ® and over the viewing area in the stack.
5) The term 'net pressure' is the pressure applied to the lamination in excess of atmospheric pressure.

Referring now to Table 1, Column 1 indicates the type of hot melt adhesive sheets used in each lamination test. Polyurethane (PU) sheets of 25 mil thickness show excellent adhesion and performance for this purpose, and may be obtained from, for example, Deerfield Urethane, P.O. Box 186, South Deerfield, Mass. 01373 (telephone: (413) 665-7016) under the trade name Deerfield Dureflex® A4100/A4700 Aliphatic Polyurethane Sheet. Although 25 mil thick sheets were used in the examples listed in Table 1, other appropriate thicknesses are also satisfactory.

In addition to polyurethane sheets, successful laminations were also achieved using 10 mil, 15 mil and 30 mil thicknesses of ethylene/vinyl acetate (EVA) copolymer hot melt adhesives. EVA hot melt adhesive sheets may be purchased from, among others, TOSOH Corporation, 3-8-2, Shiba, Minato-ku, Tokyo 105-8623, Japan.

Sheets of PVB are obtainable from Solutia, Inc., 575 Maryville Center Drive, P.O. Box 66760, St. Louis, Mo. (telephone: 1-314-674-6661).

The ratio of matrix to liquid suspension in the emulsion is shown in Column 2 of Table 1. In order to prevent oozing, which is most likely at relatively high temperatures, it has been determined that the matrix should comprise no less than about 60% of the overall emulsion. A relatively high percentage of suspension is advantageous in that an emulsion which has a relatively high percentage of liquid suspension can be made into a film with a darker dark state than a film of the same thickness which comprises a relatively lower percentage of suspension.

The matrix portion of each of the emulsions used in the examples set forth in Table 1 comprises a co-polymer of 90% by weight (a) poly (dimethyl diphenyl siloxane, disilanol terminated) and 10% by weight (b) acryloxy propyl methyl dimethoxy silane, a cross-linkable monomer. It has been found that if the amount of cross-linkable monomer in the matrix copolymer is less than 8% by weight, the SPD film is softened more than is desirable. This can cause oozing to occur at elevated temperature, which may be problematic. Increasing the percentage of cross-linkable monomer conversely strengthens the film. The percentage of the cross-linkable monomer can be increased to 15% or more by weight if desired.

The data in Column 3 of Table 1 indicate that in each example the unlaminated stack was preheated before lamination at 70 degrees C. for 30 minutes, except for the fourth from last example where it was preheated at 70° C. for 75 minutes. The second item of data in Column 3 shows for each example the length of time the stack was held at the specified temperature during the main portion of lamination. The net pressure applied to the stack is listed in Column 9, i.e., the last column at the right of the Table. In many cases, the pressure on the platens increased when the temperature was raised from 70 degrees C. to a higher temperature during the main part of lamination due to expansion of the hot melt adhesive.

The data in Column 3 demonstrates that, while maintaining above atmospheric pressure, after the short cool-down period listed in Column 4, the stack was thereafter maintained under the indicated pressure for an additional 30 minutes at room temperature (25 degrees C.) before the pressure was reduced to atmospheric pressure and the sample removed from the Carver Press.

In order to avoid using hot melt adhesive sheets which melt at too low a temperature, e.g., a temperature that might be within the probable operating range of an SPD device, it is recommended that the low end of the melting range of the hot melt adhesive be at least 75 degrees C. and preferably at least 85 degrees C. It is also preferable that it be possible within 5 hours to completely melt a film or sheet of the hot melt adhesive having a thickness in the range of 5 to 50 mils, at a temperature of 105 degrees C. or less in order to prevent or reduce the risk of film oozing during lamination and to avoid taking an unreasonably long time to effect the lamination.

However, if the emulsion incorporates a matrix which is not a polyorganosiloxane and which has a sufficiently high glass transition point, and if the particles in the liquid suspension of the emulsion will tolerate the temperature, a hot melt adhesive with a melting point of greater than 105 degrees C. may be employed.

It is also within the scope of the present invention to produce more complex embodiments than those described above. For example, a layer of PVB may be laminated between two glass sheets, whereas an SPD film is laminated separately as described above. Then the two laminates can be laminated together using PU or EVA in between a glass or plastic sheet on the exterior of the film and one of the glass sheets of the glass/PVB/glass laminate.

Moreover, instead of using glass as the outside components of a laminated stack, one may use polycarbonate (PCA) plastic of any desired thickness. In this case PU is recommended for use as the hot melt adhesive. An all-plastic laminate can save weight and prevent or reduce the chance of breakage by avoiding use of glass.

SPD light valves which comprise laminated SPD films which have been laminated by using the methods disclosed herein are superior to prior art SPD light valves, including even those comprising prior art laminated SPD films. This is because prior art SPD films were made substantially in the manner described in the above-mentioned U.S. Pat. No. 5,409,734 which discloses a type of non-crosslinked light valve film that is formed by phase separation from a homogeneous solution. It has been found that SPD light valves comprising such non-crosslinked light valve films have much poorer optical performance characteristics than SPD light valves comprising crosslinked SPD films toward which the present invention is directed. Specifically, the SPD light valves comprising non-crosslinked light valve films have a much smaller range of light transmission and much greater haze than comparable SPD light valves comprising crosslinked light valve films activated at the same voltage and frequency and having about the same off-state light transmission.

For example, an SPD light valve comprising a non-crosslinked laminated light valve film, and having an off-state light transmission of 9%, when activated with a voltage of 50 volts RMS at a frequency of 400 Hertz, would typically attain an on-state light transmission o of 44%, or a light transmission range of 35%. On-state haze would typically be about 18%, which is quite objectionable.

On the other hand, and SPD light valve comprising a crosslinked laminated light valve film, and having an off-state light transmission of 8%, when activated with a voltage of 50 volts RMS and a frequency of 400 Hertz, would typically attain an on-state light transmission of 67%, or a light transmission range of 59%. Its on-state haze would typically be in the range of 2% to 5%, which is quite moderate.

In general, for most application, SPD films must be laminated in order to be useful in SPD devices by protecting the films from the environment and by providing other performance benefits. Because the matrices and liquid suspensions used with the crosslinked emulsions of the present invention are quite different from the comparable materials used to make non-crosslinked films, as discussed above, prior art lamination methods are not applicable. It is essential therefore to find lamination procedures for the crosslinked SPD films which will avoid the problems listed herein above. The methods disclosed herein are effective in avoiding those problems, and provide not only excellent laminates but also excellent SPD devices which comprise said laminates.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for laminating a suspended particle device (SPD) film which comprises:

(a) forming a suspended particle device film comprising a cured SPD emulsion having a plurality of uncrosslinked droplets of a liquid light valve suspension distributed therein;

(b) positioning said suspended particle device film within an unlaminated stack of components for forming a laminated suspended particle device film, said stack comprising at least one hot melt adhesive sheet or film contacting an outer surface of said suspended particle device film;

(c) subjecting said unlaminated stack to at least a partial vacuum;

(d) preheating said unlaminated stack of components under said vacuum for a time and at a temperature selected to permit at least partial degassing of said stack; and (e) applying a sufficient net pressure to said stack at a sufficient temperature and for a sufficient time to produce a laminated suspended particle device film from the unlaminated stack, and wherein the method further comprises substantially preventing contact between the hot melt adhesive, when the adhesive is heated, and said cured SPD emulsion of said suspended particle device film and any protrusions of the cured SPD emulsion extending outwardly from said film, said contact being prevented by interposing a substantially chemically inert plastic material adjacent an outer edge portion of said suspended particle device film at a location chosen to substantially prevent contact of said hot melt adhesive, when the adhesive is heated, with the cured SPD emulsion of said film.

2. The method of claim 1, wherein said suspended particle device film is prepared by a method which comprises:

(a) providing a first substrate comprised of plastic or glass having first and second opposed surfaces;

(b) bonding a first layer of a substantially transparent electrically conductive coating to at least a portion of one of said opposed surfaces;

(c) applying a layer of an uncured liquid SPD emulsion upon said coating, said emulsion comprising a plurality of uncrosslinked polymer chains for forming a polymer matrix and at least one liquid light valve suspension;

(d) curing the SPD emulsion by cross-linking said polymer chains to form said cured SPD emulsion having a plurality of uncrosslinked droplets of a liquid light valve suspension distributed therein; and (e) sandwiching with said first coated substrate a second substrate coated with a second layer of said substantially transparent electrically conductive coating, wherein the second layer of said substantially transparent electrically conductive coating is in contact with the cured SPD emulsion on said first substrate, to form said suspended particle device film, wherein the SPD emulsion is cured as recited in subparagraph (d) before said sandwiching step.

3. The method of claim 2, wherein at least one of said substantially transparent electrically conductive coatings is further provided with a dielectric overcoat located thereon.

4. The method of claim 3, wherein the dielectric overcoat comprises $MgF_2$ or SiO.

5. The method of claim 2, wherein the liquid light valve suspension comprises a plurality of colloidal particles having a largest dimension avenging 1 micron or less.

6. The method of claim 5, wherein said particles have a largest dimension which averages 0.3 microns or less.

7. The method of claim 2, which further comprises laminating at least one layer of polyvinyl butyral between two glass sheets to form a second laminate and then laminating said second laminate to a face of said laminated suspended particle device film.

8. The method of claim 7, wherein the second laminate is laminated to a laminated suspended particle device film having a glass sheet on at least one face thereof, using either a polyurethane polymer or a sheet or film of ethylene/vinyl acetate copolymer between glass sheets located on the exterior of both said laminates.

9. The method of claim 2, wherein said liquid SPD emulsion is cured by exposing the uncured film to at least one of ultraviolet radiation, an electron beam and heat.

10. The method of claim 2, which further comprises providing said second substrate with a cured SPD emulsion upon the second layer of said substantially transparent electrically conductive coating prior to sandwiching said second substrate with said first substrate.

11. The method of claim 2, wherein the substantially transparent electrically conductive coating is comprised of indium tin oxide (ITO).

12. The method of claim 2, wherein at least one said substrate is formed of plastic and wherein said plastic is polyethylene terephthalate (PET) or a polycarbonate (PCA) plastic.

13. The method of claim 2, wherein said polymer chains comprise a polyorganosiloxane polymer.

14. The method of claim 2, wherein the polymer matrix comprises no less than 60% of the overall emulsion.

15. The method of claim 2, wherein the matrix of the emulsion comprises a copolymer of about 90% by weight (a) poly(dimethyl diphenyl siloxane, disilanol terminated) and about 10% by weight (b) acryloxy propyl methyl dimethoxy silane.

16. The method of claim 1, wherein the plastic material is shaped, prior to interposition upon said unlaminated statck, into a form of at least one frame, said frame configured to protect at least said outer edge portion of the suspended particle device film, while leaving a central viewing portion of said film substantially uncovered by said plastic material.

17. The method of claim 16, which further comprises applying two said frames, one upon each opposed surface of said suspended particle device film.

18. The method of claim 16, wherein said central viewing portion of the suspended particle device film defined by at least one frame is configured in the shape of a polygon, an oval or a circle.

19. The method of claim 1, wherein the preheating temperature is between about room temperature and a temperature which is the lowest end of the glass transition temperature range of any hot melt adhesive in the laminate.

20. The method of claim 19, wherein the at least one hot melt adhesive sheet or film has a melting range with a low end of at least about 75 degrees C.

21. The method of claim 19, wherein the at least one hot melt adhesive sheet or film has a melting range with a low end of at least about 85 degrees C.

22. The method of claim 1, wherein said hot melt adhesive is selected from the group consisting of an ethylene/vinyl acetate copolymer, a polyurethane polymer and polyvinyl butyral.

23. The method of claim 22, wherein the hot melt adhesive is comprised of a polyurethane polymer or polyvinyl butyral.

24. The method of claim 1, wherein said plastic material has a melting point higher than the melting point of the hot melt adhesive.

25. The method of claim 24, wherein said plastic material is comprised of polyethylene terephthalate.

26. The method of claim 1, wherein the net pressure ranges between about 2.8 psi and 27 psi.

27. The method of claim 26, wherein the net pressure is applied to said stack for between about 3-5 hours at a temperature high enough to substantially melt the at least one hot melt adhesive sheet or film but below a temperature which would cause the SPD emulsion to spread during lamination beyond a boundary which the emulsion had prior to lamination.

28. The method of claim 1, wherein said substantially chemically inert plastic material is provided with a pressure sensitive adhesive on at least one surface thereof.

29. The method of claim 1, wherein said plastic material has a thickness of less than about 2 mils.

30. The method of claim 1, wherein said plastic material is interposed as a plurality of sheets or strips.

31. The method of claim 1, wherein the vacuum applied to the unlaminated stack of components is at least about 29 inches of mercury.

32. The method of claim 1, which further comprises laminating the suspended particle device film in an autoclave adapted to provide sufficient net pressure, temperature and vacuum to laminate said film.

33. A method for laminating a suspended particle device (SPD) film which comprises:
  (a) forming a suspended particle device film comprising a cured SPD emulsion:
  (b) positioning said suspended particle device film within an unlaminated stack of components for forming a laminated suspended particle device film, said stack comprising at least one hot melt adhesive sheet or film contacting an outer surface of said suspended particle device film;
  (c) subjecting said unlaminated stack to at least a partial vacuum;
  (d) preheating said unlaminated stack of components under said vacuum for a time and at a temperature selected to permit at least partial degassing of said stack; and
  (e) applying a sufficient net pressure to said stack at a sufficient temperature and for a sufficient time to produce a laminated suspended particle device film from the unlaminated stack,
wherein the method additionally comprises substantially preventing contact between the hot melt adhesive, when the adhesive is heated, and said cured SPD emulsion of said SPD film and any protrusions of the SPD emulsion extending outwardly from said film, said contact being prevented by interposing a substantially chemically inert plastic material adjacent an outer portion of said suspended particle device film at a location chosen to substantially prevent contact of said hot melt adhesive, when the adhesive is heated, with the cured SPD emulsion of said film, and wherein said suspended particle device film is prepared by a method which comprises
  (f) providing a first substrate comprised of plastic or glass having first and second opposed surfaces;
  (g) bonding a first layer of a substantially transparent electrically conductive coating to at least a portion of one of said opposed surfaces;
  (h) applying a layer of an uncured liquid SPD emulsion upon said coating, said emulsion comprising a plurality of uncrosslinked polymer chains for forming a polymer matrix and at least one liquid light valve suspension;
  (i) curing the SPD emulsion by cross-linking said polymer chains to form said cured SPD emulsion having a plurality of uncrosslinked droplets of a liquid light valve suspension distributed therein; and
  (j) sandwiching with said first coated substrate a second substrate coated with a second layer of said substantially transparent electrically conductive coating, wherein the second layer of said substantially transparent electrically conductive coating is in contact with the SPD emulsion on said first substrate, to form said suspended particle device film, wherein the SPD emulsion is cured as recited in subparagraph (i) before said sandwiching step.

34. The method of claim 33, which further comprises laminating at least one layer of polyvinyl butyral between two glass sheets to form a second laminate and then laminating said second laminate to one side of said laminated suspended particle device film.

35. The method of claim 34, wherein said second laminate is laminated to a laminated suspended particle device film having a glass sheet on at least one face thereof using either a polyurethane polymer or a sheet or film of ethylene/vinyl acetate copolymer between the glass sheets located on the exterior of both said laminates.

36. The method of claim 33, wherein said hot melt adhesive is selected from the group consisting of an ethylene/vinyl acetate copolymer, a polyurethane polymer and polyvinyl butyral.

37. The method of any one of claims 33, 36 and 34, wherein at least one of said transparent electrically conductive coatings is further provided with a dielectric overcoat located thereon.

38. The method of claim 37, wherein said dielectric overcoat comprises $MgF_2$ or SiO.

39. The method of any one of claims 33, 36 and 34, wherein the net pressure ranges between about 2.8 psi and 27 psi.

40. The method of claim 39, wherein the net pressure is applied to said stack for between about 3-5 hours at a temperature high enough to substantially melt the at least one hot melt adhesive sheet or film, but below a temperature which would cause the SPD emulsion to spread during lamination beyond a boundary which the cured emulsion had prior to lamination.

41. The method of any one of claims 33, 36 and 34, which further comprises providing said second substrate with a cured SPD emulsion upon the second layer of said substantially transparent electrically conductive coating prior to sandwiching said second substrate with said first substrate.

42. The method of any one of claims 33, 36 and 34, wherein the vacuum applied to the unlaminated stack of components is at least about 29 inches of mercury.

43. The method of anyone of claims 33, 36 and 34, wherein the pre-heating temperature is between about room temperature and a temperature which is the lowest end of the glass transition temperature range of any hot melt adhesive in the laminate.

44. The method of any one of claims 33, 36 and 34, wherein the liquid light valve suspension comprises a plurality of colloidal particles having a largest diameter averaging 1 micron or less.

45. The method of any one of claims 33, 36 and 34, wherein said polymer chains comprise a polyorganosiloxane polymer.

46. The method of any one of claims 33, 36 and 34, wherein the polymer matrix comprises no less than 60% of the overall emulsion.

47. The method of any one of claims 33, 36 and 34, wherein the matrix of the emulsion comprises a copolymer of about 90% by weight (a) poly(dimethyl diphenyl siloxane, disilanol terminated) and about 10% by weight (b) acryloxy propyl methyl dimethoxy silane.

48. The method of any one of claims 33, 36 and 34, which further comprises laminating the suspended particle device film in an autoclave adapted to provide sufficient net pressure, temperature and vacuum to laminate said film.

49. The method of claim 33, wherein said substantially chemically inert plastic material has a melting point higher than the melting point of the hot melt adhesive and a thickness of less than about 2 mils.

50. The method of claim 33, wherein said plastic material is interposed as a plurality of sheets or strips.

51. The method of claim 33, wherein said plastic material is formed into a shape of at least one frame, configured to protect said outer edge portion, while leaving a central viewing portion of said suspended particle device film substantially uncovered by said plastic material.

* * * * *